July 23, 1968   P. J. HARGET ET AL   3,393,448
METHOD FOR MAKING THERMISTORS

Filed Dec. 22, 1965   2 Sheets-Sheet 1

Resistivity of Iron Titanate Rutile Compound
as a Function of Heat Treatment Temperature INVENTOR.
PAUL J. HARGET
DENNIS T. STURGILL
BY W. A. Schaich
and
Richard D. Heberling
ATTORNEYS Typical Characteristics of Iron Titanate Rutile Thermistors after Heat Treatment though apparently stable in use at temperatures exceeding the temperatures of heat treatment are unstable if the use temperature exceeds the heat treatment temperature.

United States Patent Office
3,393,448
METHOD FOR MAKING THERMISTORS
Paul J. Harget, Ann Arbor, Mich., and Dennis T. Sturgill, Toledo, Ohio, assignors to Owens-Illinois, Inc., a corporation of Ohio
Filed Dec. 22, 1965, Ser. No. 515,676
8 Claims. (Cl. 29—612)

The present invention relates to thermistors having desirable high temperature properties. More particularly, the present invention relates to thermistors formed of iron-titanate in rutile titanium oxide and method of preparing the same.

Thermistors are thermally sensitive resistors that exhibit a change in electrical resistance as a function of temperature. Heretofore, thermistors capable of operating at high temperatures have been unattainable. Up to the present time, thermistors were generally fabricated by sintering powdered mixtures of manganese oxide, cobalt oxide, nickel oxide and ferrous-ferric oxide with traces of lithium oxide as a valence adjuster. Previous methods generally required making a mixture of the aforementioned ingredients in the form of a paste using powdered glass or an organic resin as a binder. This paste is then dabbed onto platinum wires or pressed into discs or other desired shapes. The shapes must then be sintered at very high temperatures, e.g., between 1,000° C. and 1350° C. Because of the fact that high sintering temperatures are necessary, the choice of lead wires is usually restricted to platinum or its alloys.

As a result, there has been a need for a thermistor capable of stable operations at elevated temperatures, for example, above about 600° F. Many thermistor manufacturers have been working on this problem and some progress has been made. However, in most instances the electrical properties of thermistors have changed rapidly at temperatures above about 600° F. thereby resulting in unsatisfactory performance.

Accordingly, it is an object of the present invention to provide novel thermistors having desirable properties and characteristics making them suitable for a wide variety of uses.

It is a further object of the present invention to provide thermistors capable of operating at elevated temperatures.

It is a further object of the present invention to provide thermistors capable of stable operation over a large temperature range.

It is a further object of the present invention to provide a method for making thermistors capable of operating at elevated temperatures.

In attaining the above objects, one feature of the present invention resides in forming a thermistor from ferric titanate.

Another feature of the present invention resides in forming a thermistor from a molten composition containing iron and titanium.

A further feature of the present invention resides in providing thermistors by forming a body of ferric titanate and thereafter subjecting the body to a heat treatment to adjust its resistance to the proper level and to obtain stable operating characteristics.

A further feature of the present invention resides in ferro-electric device prepared from ferric titanate.

The above, as well as other objects, features and advantages of the present invention will become apparent from the following detailed description thereof, taken in conjunction with the drawings wherein.

According to the present invention, thermistors are prepared from ferric titanate which are particularly useful for operating at elevated temperatures. Because of their very stable characteristics, thermistors of the present invention can be used for many applications. In carrying out the present invention a mineral composition containing titanium and iron is oxidized to produce the ferric form of iron by roasting or melting an oxidizing atmosphere. A suitable starting material for this purpose is the natural mineral ilmenite containing $FeO \cdot TiO_2$ and some $Fe_2O_3$. The ferrous iron contained therein is oxidized to the ferric state. The resulting product is predominantly ferric titanate ($Fe_2 \cdot TiO_5$) with excess $TiO_2$ as a by-product. It is preferred that the ilmenite be ground to a relatively fine condition; e.g. −100 mesh granular powder. The granular mineral is preferably roasted in air at about 2400° F. for a period of time that varies from 16 to 24 hours, thereafter the composition is melted to form a glass or a slag at about 2800° F. and then recrystallized on slow cooling in air. This process results in a virtually complete conversion to the desired product ferric titanate.

The roasted and fused ilmenite forms a solid solution of $Fe_2TiO_5$ with excess $TiO_2$. The two crystalline compounds include a wide variety of solid solution series each with different electrical properties.

It is noted that the foregoing is simply given by way of illustrating the preferred method for obtaining the ferric-titanate present for purposes of the present invention. The procedures set forth can be varied and should not be considered as limiting the present invention.

The ferric-titanate-rutile compound as prepared above is formed as a bead on at least one lead either by flame-working or dipping into the fused material. Thermistor devices can also be formed by pressing or molding the material into cylinders or disks. Leads may be formed of platinum, palladium, stainless steel or any other metal or alloy with a melting temperature greater than 2800° F. The formation can be done in a reducing atmosphere thus eliminating the possibility of lead oxidation. The ferric-titanate-rutile compound is soft enough that little problem is encountered in matching thermal expansion characteristics of the lead wires. It will be apparent of course that in order to make a good bond between the glass and the lead wires the coefficients of thermal expansion of the glass and wire should be as close as possible.

Figure 1:
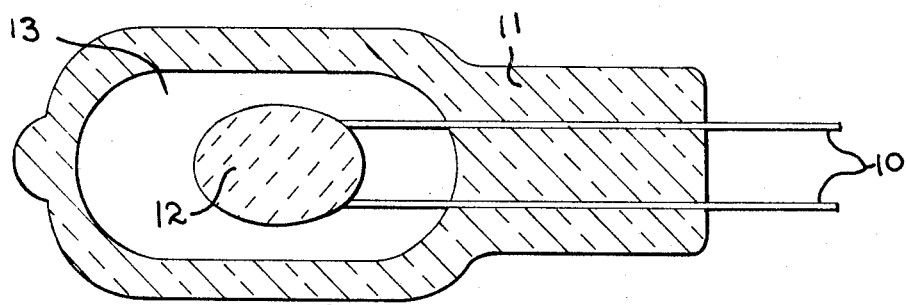
FIGURE 1 is a completely assembled thermistor device in accordance with the present invention.
Figure 2:
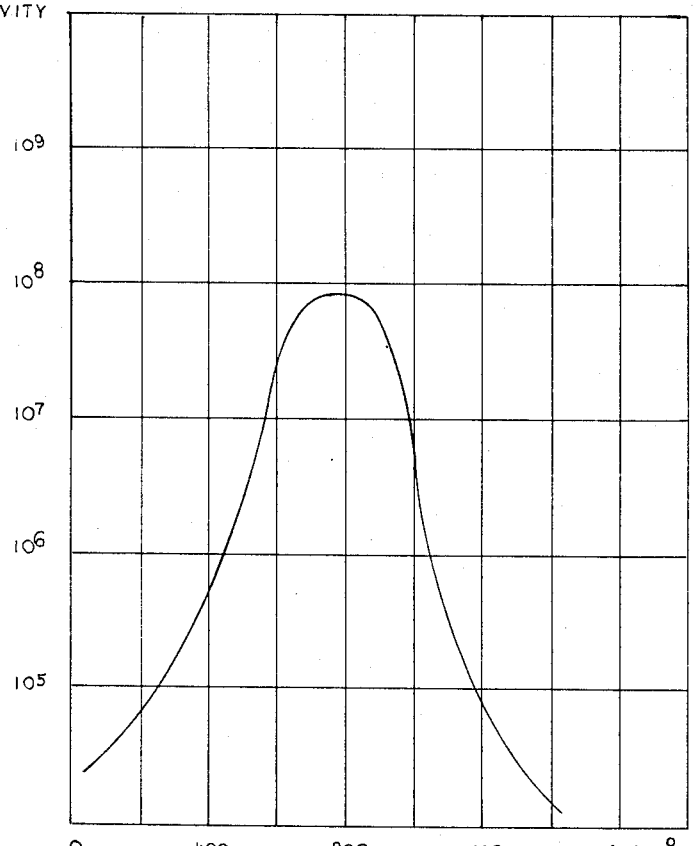
FIGURE 2 is a graph showing the resistivity of iron-titanate-rutile compound as a function of heat treatment temperature.

After the device, such as shown in FIGURE 1, is formed it is given a low temperature heat-treatment to adjust its resistance to the proper level and to obtain the stable operating characteristics. Generally the heat treatment can vary, but it is preferred that it be performed in an air atmosphere between 200° C. and 700° C. depending upon the final characteristics desired. FIGURE 2 shows the curve of the final resistivity as a function of heat-treatment temperature. It will therefore be apparent that the resistivity can be tailored to meet any suitable requirements by varying the heat treatment temperature. Treatments can also be performed on the back side of the curve, mainly above 700° C. but little advantage is achieved thereby inasmuch as lower temperatures permit the use of metal leads which normally oxidize in the air at higher temperatures. Moreover, as may be seen from FIG. 2 it is possible to obtain the same resistivity characteristic by performing the heat treatment at lower temperatures. It can be seen that the devices may be adjusted approximately 4 orders of magnitude in resistance by using the proper temperature in the above heat treatment. In some cases, the devices held at temperatures long enough to come to complete oxidation equilibrium with the air atmospheres. This normally requires about 16 hours of treatment time. However, shorter time or longer time may be used, from 1 to 20 hours usually being sufficient depending upon the temperature of the desired properties of the end product.

Figure 3:
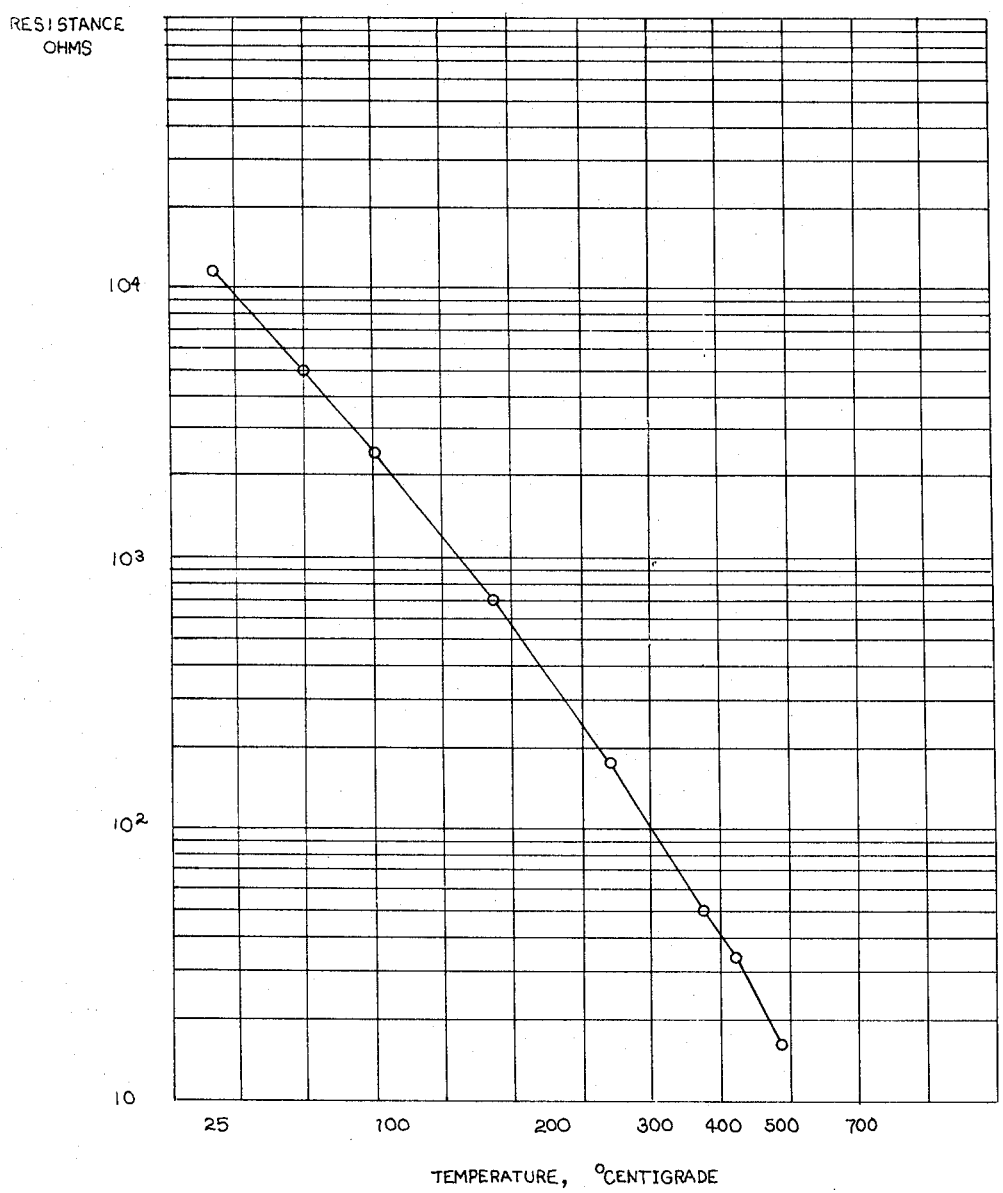
FIGURE 3 is a graph of a plot of temperature vs. resistance showing characteristics of typical ferric titanate-rutile thermistors of the present invention as a function of heat treatment.

After the heat treatment is completed the device is sealed in a small glass envelope in an air atmosphere. This prevents any further change in the oxidation in the state of the ferric titanate-rutile compound during subsequent heating and cooling cycles. A representative device is shown in FIGURE 1 wherein leads 10 are sealed into glass envelope 11. Ferric titanate-rutile compound 12 is sealed onto the end of the electrical leads. Air 13 fills the chamber in the glass envelope. If desired other gases may be used in the chamber. The glass used in the envelope is selected to match the thermal expansion characteristics of the lead wire. Normally, the highest melting glass with the proper expansions is selected. Satisfactory seats have been made with a variety of metals, for example, platinum and molybdenum. The electrical characteristics of these devices can be adjusted to a straight line $1/T$ curve or to a nonlinear curve useful for non-linear circuits. A typical curve is shown in FIGURE 3.

Thermistors made in accordance with the present invention, were tested by heating to 932° F. and holding it there for 120 hours. The slope characteristics were measured before and after the test and no measurable changes were found. The temperature was limited to 932° F. because of the low softening point of the glass used for the envelope. Thereafter, the thermistors were reheated to 932° F. and 40 ma. direct current passed through it for 120 hours. This amounted to a total charge passage of 17,250 coulombs. Again, no change could be detected in the electrical resistance characteristics, either 932° F. or at room temperature. This is a very severe test and to the best of applicants' present knowledge no known thermistor is capable of performing as well.

The devices of the present invention are characterized by a number of advantages including the fact that the materials used are readily available, not expensive and easily controlled. Thermistor resistance characteristics can be varied over 4 or more orders of magnitude with no change in the manufacturing process other than changing the heat treatment temperatures. The upper usable temperature limit for the device depends on a softening point of the glass used for the envelope, approximately 1800° F. represents the usual limits of commercially available glass and the oxidation resistance of the exposed metal leads. The electrical life characteristics of the thermistors of the present invention are superior to those presently available and the process can be varied to produce a wide variety and assortment of non-linear type thermistors some of which are used to greatly simplify electronic control circuits.

What is claimed is:

1. A method of making a thermistor device capable of stable operation at elevated temperature which comprises oxidizing a material containing $TiO_2$ and $FeO \cdot TiO_2$, heating the oxidized material to a temperature above the melting point of said oxidized material, shaping the molten material into a desired configuration, placing it on at least one metal lead, cooling said molten material to form a solid ferric titanate-rutile compound and thereafter heating the device to a temperature of at least about 200° C. for a sufficient period of time to obtain the desired resistivity characteristics.

2. The method as defined in claim 1 wherein the material containing $TiO_2$ and $FeO \cdot TiO_2$ is ilmenite.

3. The method as defined in claim 1 wherein the material is finely divided ilmenite and is roasted in air at about 2400° F. for a period of time between 16 and 24 hours.

4. The method as defined in claim 1 wherein the device is heat treated at between 200° C. and 700° C.

5. A method of forming a thermistor device which comprises roasting ilmenite containing ferrous titanate at a temperature of about 2400° F. for a period of 16 to 24 hours, heating the roasted material to at least about 2800° F. to melt said roasted material, forming a shaped body from said molten roasted material, placing said shaped body onto at least one electrical lead, cooling said shaped body to solidify said shaped body, recrystallizing from the composition as the predominant crystalline phase ferric titanate in $TiO_2$, heat treating the thermistor at a temperature of at least about 200° C. and then thereafter sealing the electrical lead in a glass envelope whereby the ferric titanate is encapsulated in the glass envelope and surrounded by an air atmosphere.

6. A method of forming a thermistor device which comprises crushing ilmenite mineral composition containing ferrous oxide and titanium dioxide to a granular powder, oxidizing the composition to convert essentially all of the iron present to the ferric state, heating the oxidized composition to melt said oxidized composition at a temperature of about 2800° F. forming a shaped body from said molten oxidized composition, placing said shaped body on at least one electrical lead, cooling said shaped body to solidify said shaped body and subjecting the device to a heat treatment in an air atmosphere between 200° C. and 700° C. to adjust a resistance of the material to the predetermined level and sealing said lead containing said shaped body in a glass envelope.

7. In the method as defined in claim 6 wherein the predominant crystalline phase that is crystallized out upon heat treatment is $Fe_2TiO_5$ in excess $TiO_2$.

8. In the method as defined in claim 6 wherein the ferric titanate-rutile compound is shaped into the form of a bead on the metal lead.

References Cited

UNITED STATES PATENTS

| | | | |
|---|---|---|---|
| 2,371,660 | 3/1945 | Wainer | 252—520 |
| 2,462,162 | 2/1949 | Christensen et al. | 338—22 X |
| 2,590,894 | 4/1952 | Sanborn | 252—520 X |
| 2,616,859 | 11/1952 | Verwey | 252—519 X |
| 2,735,824 | 2/1956 | Haayman et al. | 252—520 X |
| 2,797,175 | 6/1957 | Horton | 252—519 X |

JOHN F. CAMPBELL, *Primary Examiner.*

J. L. CLINE, *Assistant Examiner.*

UNITED STATES PATENT OFFICE
CERTIFICATE OF CORRECTION

Patent No. 3,393,448                              July 23, 1968

Paul J. Harget et al.

It is certified that error appears in the above identified patent and that said Letters Patent are hereby corrected as shown below:

Column 1, line 65, "device" should read -- devices --. Column 2, lines 34, 37 and 46, "ferric-titanate", each occurrence, should read -- ferric titanate --. Column 3, line 22, "seats" should read -- seals --. Column 4, lines 18 and 26, "about", each occurrence, should read -- above --; line 36, after "F." insert a comma; line 41, "a" should read -- the --.

Signed and sealed this 3rd day of March 1970.

(SEAL)
Attest:

Edward M. Fletcher, Jr.
Attesting Officer

WILLIAM E. SCHUYLER, JR.
Commissioner of Patents